United States Patent
Milder et al.

(10) Patent No.: US 8,041,462 B2
(45) Date of Patent: Oct. 18, 2011

(54) SYSTEM AND METHOD FOR CONTROLLING HYDRONIC SYSTEMS HAVING MULTIPLE SOURCES AND MULTIPLE LOADS

(75) Inventors: Fredric Milder, Galisteo, NM (US); Boaz Soifer, Cerrillos, NM (US); Bristol Stickney, Tesuque, NM (US)

(73) Assignee: Solarlogic, LLC, Sante Fe, NM (US)

(*) Notice: Subject to any disclaimer, the term of this patent is extended or adjusted under 35 U.S.C. 154(b) by 0 days.

(21) Appl. No.: 13/069,085

(22) Filed: Mar. 22, 2011

(65) Prior Publication Data

US 2011/0172830 A1    Jul. 14, 2011

Related U.S. Application Data

(63) Continuation-in-part of application No. 12/960,652, filed on Dec. 6, 2010, which is a continuation of application No. 12/943,617, filed on Nov. 10, 2010, which is a continuation of application No. 12/411,055, filed on Mar. 25, 2009, now Pat. No. 7,848,853.

(60) Provisional application No. 61/052,860, filed on May 13, 2008.

(51) Int. Cl.
*G05D 7/00* (2006.01)
*G05D 11/00* (2006.01)
*G05D 9/00* (2006.01)
*G05B 11/01* (2006.01)
*G06F 19/00* (2011.01)

(52) U.S. Cl. .......... 700/282; 700/18; 700/181; 700/182; 700/281

(58) Field of Classification Search .............. 700/18, 700/86–87, 181–182, 281–282
See application file for complete search history.

(56) References Cited

U.S. PATENT DOCUMENTS

| | | |
|---|---|---|
| 3,996,759 A | 12/1976 | Meckler |
| 3,996,998 A | 12/1976 | Garst et al. |
| 4,034,912 A | 7/1977 | Hayes |
| 4,102,390 A | 7/1978 | Harnish et al. |
| 4,178,988 A | 12/1979 | Cann et al. |
| 4,190,199 A | 2/1980 | Cawley et al. |
| 4,205,381 A | 5/1980 | Games et al. |
| 4,215,408 A | 7/1980 | Games et al. |
| 4,304,219 A | 12/1981 | Currie |
| 4,339,930 A | 7/1982 | Kirts |
| 4,407,447 A | 10/1983 | Sayegh |
| 4,476,920 A | 10/1984 | Drucker et al. |
| 4,505,426 A | 3/1985 | Rossi et al. |

(Continued)

*Primary Examiner* — Ramesh Patel
(74) *Attorney, Agent, or Firm* — Christopher & Weisberg, P.A.

(57) ABSTRACT

A method and system for designing and controlling a hydronic apparatus. In one aspect of the invention, the system includes a computing device having a first receiver that receives input data, in which the input data includes environmental data and hydronic apparatus data. The computing device also includes a first processor that communicates with the first receiver. The first processor processes the received input data into configuration data that includes a hydronic apparatus layout. The hydronic apparatus layout indicates a plurality of hydronic components and fluid connections between the hydronic components. The computing device also includes a transmitter that transmits the configuration data. The system also includes a controller that has a stored set of rules and a second receiver that receives the configuration data. The controller includes a second processor that processes the received configuration data to correlate the configuration data with the default rules and select a corresponding subset of the set of default rules.

20 Claims, 5 Drawing Sheets

U.S. PATENT DOCUMENTS

| | | | |
|---|---|---|---|
| 4,645,908 A | 2/1987 | Jones | |
| 4,685,615 A | 8/1987 | Hart | |
| 4,775,944 A | 10/1988 | Nakamura | |
| 4,897,798 A | 1/1990 | Cler | |
| 4,971,136 A | 11/1990 | Mathur et al. | |
| 5,259,445 A | 11/1993 | Pratt et al. | |
| 5,701,750 A * | 12/1997 | Ray | 62/160 |
| 5,775,581 A * | 7/1998 | Welden | 237/8 R |
| 5,814,902 A | 9/1998 | Creasy et al. | |
| 5,892,690 A | 4/1999 | Boatman et al. | |
| 6,122,603 A | 9/2000 | Budike, Jr. | |
| 6,263,260 B1 | 7/2001 | Bodmer et al. | |
| 6,311,105 B1 | 10/2001 | Budike, Jr. | |
| 6,385,510 B1 | 5/2002 | Hoog et al. | |
| 6,427,923 B1 | 8/2002 | Neve et al. | |
| 6,487,457 B1 | 11/2002 | Hull et al. | |
| 6,575,233 B1 | 6/2003 | Krumnow | |
| 6,729,390 B1 | 5/2004 | Toth et al. | |
| 6,757,591 B2 | 6/2004 | Kramer | |
| 6,874,693 B2 | 4/2005 | Readio et al. | |
| 6,909,921 B1 | 6/2005 | Bilger | |
| 6,912,429 B1 | 6/2005 | Bilger | |
| 6,957,696 B1 * | 10/2005 | Krumnow | 165/208 |
| 6,994,158 B2 | 2/2006 | Beitelmal et al. | |
| 7,274,973 B2 | 9/2007 | Nichols et al. | |
| 7,284,710 B2 | 10/2007 | Rixen et al. | |
| 7,311,986 B2 * | 12/2007 | Hsu | 429/425 |
| 7,343,226 B2 * | 3/2008 | Ehlers et al. | 700/276 |
| 7,389,159 B2 | 6/2008 | Warren et al. | |
| 7,398,778 B2 | 7/2008 | Kaiser | |
| 7,424,345 B2 | 9/2008 | Norbeck | |
| 7,444,189 B1 | 10/2008 | Marhoefer | |
| 7,848,853 B2 | 12/2010 | Milder et al. | |
| 2003/0066897 A1 * | 4/2003 | Carner et al. | 236/51 |
| 2003/0213246 A1 * | 11/2003 | Coll et al. | 60/653 |
| 2004/0058230 A1 * | 3/2004 | Hsu | 429/62 |
| 2004/0227003 A1 | 11/2004 | Alvarez et al. | |
| 2005/0258261 A1 | 11/2005 | Gast | |
| 2006/0049268 A1 | 3/2006 | Weimer et al. | |
| 2007/0043478 A1 | 2/2007 | Ehlers et al. | |
| 2007/0114296 A1 | 5/2007 | Walborn | |
| 2007/0163773 A1 | 7/2007 | Webb et al. | |
| 2007/0239317 A1 | 10/2007 | Bogolea et al. | |
| 2008/0023564 A1 | 1/2008 | Hall | |
| 2008/0195254 A1 | 8/2008 | Jung et al. | |
| 2008/0195687 A1 | 8/2008 | Jung et al. | |
| 2008/0215186 A1 * | 9/2008 | Reid et al. | 700/277 |
| 2008/0271881 A1 * | 11/2008 | Blecker | 165/254 |
| 2008/0281472 A1 | 11/2008 | Podgorny et al. | |
| 2008/0294291 A1 * | 11/2008 | Salsbury | 700/277 |
| 2008/0306632 A1 | 12/2008 | Miki et al. | |
| 2009/0000611 A1 * | 1/2009 | Kaiser | 126/637 |
| 2009/0012650 A1 | 1/2009 | Wang et al. | |

* cited by examiner

SYSTEM AND METHOD FOR CONTROLLING HYDRONIC SYSTEMS HAVING MULTIPLE SOURCES AND MULTIPLE LOADS

CROSS-REFERENCE TO RELATED APPLICATION

This application is a continuation-in-part-of and claims priority from pending U.S. patent application Ser. No. 12/960,652, filed Dec. 6, 2010, entitled SYSTEM AND METHOD FOR CONTROLLING HYDRONIC SYSTEMS HAVING MULTIPLE SOURCES AND MULTIPLE LOADS which is a Continuation of and claims priority from pending U.S. patent application Ser. No. 12/943,617, filed Nov. 11, 2010, entitled SYSTEM AND METHOD FOR CONTROLLING HYDRONIC SYSTEMS HAVING MULTIPLE SOURCES AND MULTIPLE LOADS which is a Continuation of and claims priority from U.S. patent application Ser. No. 12/411,055, filed Mar. 25, 2009, entitled SYSTEM AND METHOD FOR CONTROLLING HYDRONIC SYSTEMS HAVING MULTIPLE SOURCES AND MULTIPLE LOADS, now issued U.S. Pat. No. 7,848,853, issued Dec. 7, 2010, which claims priority to U.S. Provisional Patent Application Ser. No. 61/052,860, filed May 13, 2008, entitled MODULAR DESIGN METHOD FOR SOLAR HYDRONIC SYSTEMS, the entire contents of which are incorporated herein by reference.

STATEMENT REGARDING FEDERALLY SPONSORED RESEARCH OR DEVELOPMENT n/a

FIELD OF THE INVENTION

The present invention relates to a method and system for designing, configuring and controlling a hydronic system.

BACKGROUND OF THE INVENTION

Some homes and businesses employ zoned radiant heating systems or hydronic heating systems to heat living spaces, pools, spas, walkways and driveways. Hydronic heating systems distribute heated fluid through a series of heat exchanging pipes that are positioned throughout the heating zone. Conventional hydronic systems use on-demand sources, such as boilers and chillers, to thermally adjust fluids that circulate throughout the system.

Hydronic heating systems placed in living spaces may include radiant floor pipes and baseboard mounted or freestanding radiators that transfer heat from a plurality of boilers to the target heating zones. A controller is provided to receive heating request signals from heating zone thermostats. The controller communicates with aquastats, an injection system, fluid circulators and fluid valves to supply heated fluid from the boiler to the selected heating zones. While conventional hydronic heating systems may be coupled to solar heating systems to supplement the boiler heating capacity, existing controllers are not configured to optimize and/or store energy supplied from the solar heating systems. Various other drawbacks exist with these systems and other known systems in the prior art.

Moreover, the expanding interest in these solar hydronic systems has exposed two problems that currently plague the hydronic heating industry: lack of installation expertise and lack of design expertise in these newer complex solar hydronic systems. While hydronic system installers may be found, they often lack the expertise required to design and install these newer solar hydronic systems. Moreover, it is estimated that there are only a few hundred solar hydronic experts located in the United States, those of which are scattered all over the country.

Even though manufactures started to develop mainstream solar hydronic systems for homes or businesses, these manufactures have not addressed the problem that only a small percentage of hydronic heating installers have the training and/or expertise to design solar hydronic systems. The sporadic placement of these few solar hydronic experts often leaves home builders, buyers or architects who want to install a solar hydronic heating system without any reasonable alternatives. Therefore, there exists a need in the industry to simplify the design, configuration and control processes of a hydronic system so as to enable the average hydronic system installer to install and configure these newer, more complex solar hydronic systems.

SUMMARY OF THE INVENTION

The present invention advantageously provides a method and system for designing and controlling a hydronic apparatus. In one aspect of the invention, the system includes a computing device having a first receiver receiving input data, in which the input data includes environmental data and hydronic apparatus data. The computing device also includes a first processor communicating with the first receiver. The first processor processes the input data into configuration data that includes a hydronic apparatus layout indicating a plurality of hydronic components and fluid connections between the hydronic components. The computing device also includes a transmitter that transmits the configuration data. The system also includes a controller having a stored set of rules and a second receiver that receives the configuration data. The controller includes a second processor that processes the configuration data to correlate the configuration data with the default rules and select a corresponding subset of the set of default rules.

In another aspect of the invention, the method for designing and controlling a hydronic apparatus includes receiving input data including environmental data and hydronic apparatus data. The method includes processing the input data into configuration data, in which the configuration data includes a hydronic apparatus layout indicating a plurality of hydronic components and fluid connections between the hydronic components. The method also includes transmitting the configuration data from a computing device, receiving configuration data at a controller and processing the configuration data at the controller. The method also includes storing a set of default rules in the controller and selecting a subset of the set of default rules based at least on the processed configuration data.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
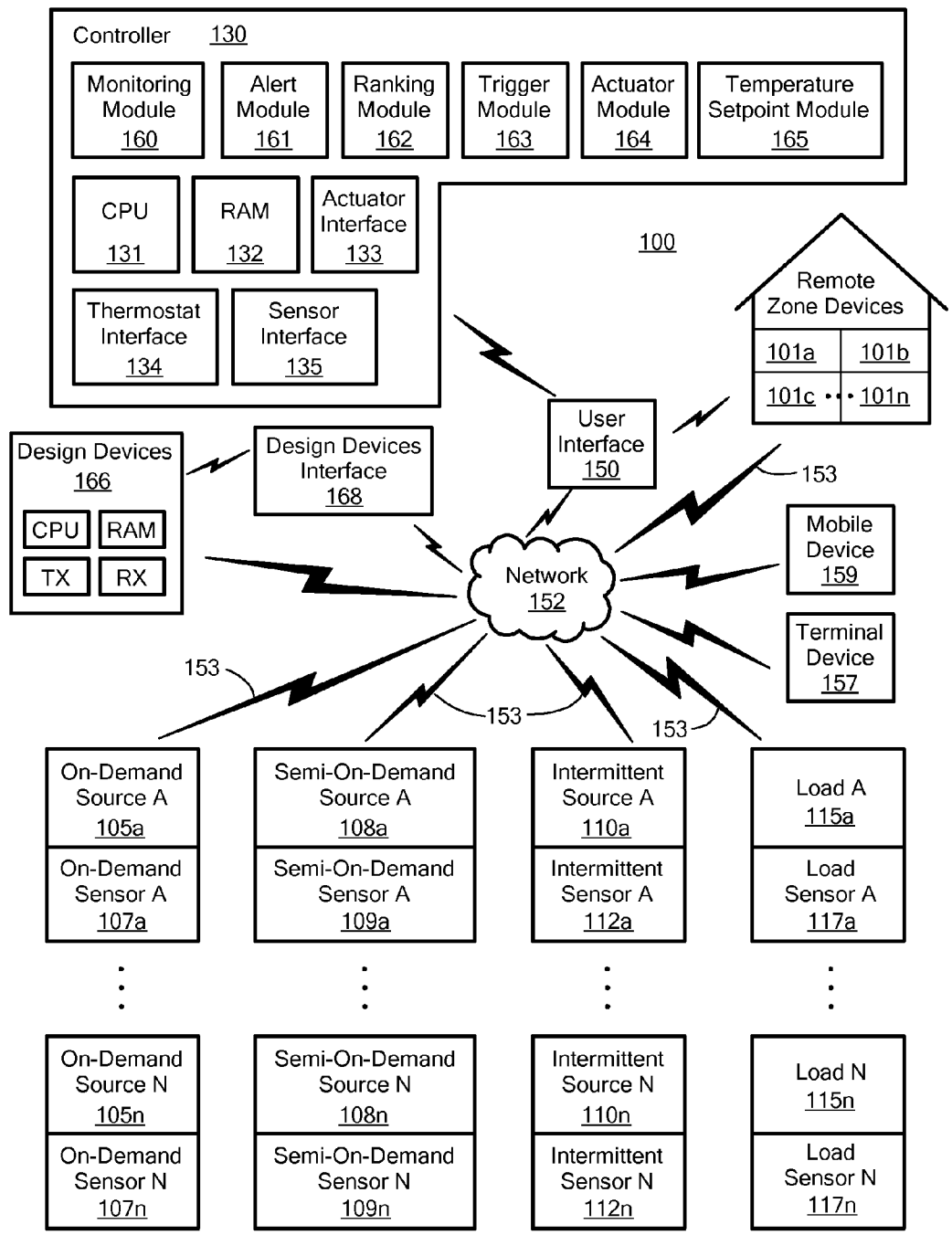
FIG. 1 illustrates an exemplary system diagram according to one embodiment of the invention.

The invention provides multiple sources and multiple load hydronic systems having controllers that may be coupled to the plurality of sources and loads. The multiple sources may include boilers, solar heat collectors, wood fired hydronic boilers, heat pumps, and heat storage devices, among other sources. The multiple loads may include domestic hot water, baseboard or radiator zones, radiant heated floors (mass or non-mass floors), pool or tub with external heat exchanger, pool or tub with direct radiant heating, ice melt zones, and heat storage device. Heat storage devices include any structures that store heat, such as a water tank, in-mass floors, or other heat storage devices. In-mass floors have radiant tubing within a heat storage material, such as concrete.

The multiple sources include on-demand, semi-on-demand, and intermittent sources. On-demand sources include any devices that may be activated and deactivated upon a user's demand. For example, on-demand sources include geothermal devices, common boilers and furnaces, and heat pumps, among other on-demand sources. According to one embodiment, on-demand sources may operate using energy sources, such as electricity, natural gas, propane, gasoline, and fuel oil, among other energy sources.

Semi-on-demand sources include any devices that may be activated and deactivated on demand, but that have features that differentiate them from on-demand sources. The features may include non-instantaneous production of desired results, such as delayed heating or cooling, among other features. For example, upon activation, semi-on-demand sources may take an extended period of time to attain a desired temperature. Alternatively, upon deactivation, semi-on-demand sources may retain residual energy that may be directed to other sources or loads. Semi-on-demand sources may include wood- or biomass-burning boilers and furnaces, among other semi-on-demand sources.

By contrast, intermittent sources include sources that are activated and deactivated upon the occurrence of events that are uncontrolled by the system. For example, intermittent sources may include solar thermal sources (such as solar panels), wind generators, manually operated furnaces such as wood-burning furnaces fired by homeowners, and co-generation devices, among other intermittent sources. Solar thermal sources produce heat energy when solar rays impinge solar collectors during daylight hours. By contrast, solar thermal sources produce reduced or no heat energy during overcast conditions or during non-daylight hours.

Co-generation devices may include back-up power generators. Co-generation devices may be on-demand sources or intermittent sources and may be used in conjunction with other sources of the hydronic system. For example, back-up power generators may include engines, which are configured to produce electricity, but generate significant waste heat. The back-up power generators may be fluid cooled to capture the waste heat, which may be applied to the hydronic system. Back-up power generators configured as on-demand sources would be activated to produce heat and electricity when other sources are not producing sufficient heat energy.

Alternatively, according to one embodiment, back-up power generators may be configured exclusively as intermittent sources. Back-up generators configured in this manner are activated to supply back-up electricity. Under these conditions, the heating system is not in control of when the waste heat is produced by the generator. A system is needed that will provide efficient and reliable use of the on-demand, semi-on-demand, and the intermittent sources.

The invention may further include a device for designing a hydronic system based, in part, on data entered by the user and/or installer. The device may also use default data to design the hydronic system. The device may use specific information about the sources, loads and hydronic zones to design the system. Also, design process may use information about the climate region in which the system is to be installed. The design process may also use information about the physical restrictions of the site at which the system is to be installed. The device may output a file including information indicating the major hydronic components of the designed hydronic system and the specific configuration of the designed hydronic system. The file may be transmitted to a controller for hydronic systems via communication known in the art such as through a network, internet, removable memory devices and the like.

The invention further provides a controller that may include a software program that processes a received file and determines the specific set of rules that are used by the controller to operate the hydronic system. The controller for hydronic systems may further obtain performance measurements of system components. Performance measurements include fluid flows, intake temperature readings, output temperature readings, preheat temperature readings, temperature rise at start-up, component current consumption, voltage drops, and component revolutions per minute, among other performance measurements. System components include pumps, valves, boilers, furnaces, thermostats and aquastats, among other system components. According to one embodiment, the performance measurements may be analyzed to provide metrics, including failure diagnostics, energy capture, and usage optimization, among other metrics. The controller may be programmed to execute a set of rules that are manually entered by a user or that are automatically created based on the performance measurements. Fluid flow measurements and temperature gradient measurements may be employed to determine an amount of energy supplied by a component, the amount of energy used by a load, and source device efficiency. These measurements may provide a determination of fuel consumption reduction due to the introduction of solar heat or other renewable heat sources. These measurements may also allow a determination of heat lost to non-productive uses. Non-productive uses include heat energy lost by a heat storage device and heat dissipated to a surrounding environment by a domestic hot water tank, among other non-productive uses.

The invention further provides a controller that measures British Thermal Units (BTUs) produced and used by the plurality of sources and loads. According to one embodiment, the invention may generate a BTU summary for the hydronics system based on individual devices. Alternatively, the invention may generate a BTU summary for the hydronics system based on groups of devices. The BTU measurements may be used to calculate incentives, including renewable energy credits, carbon emissions tax reduction, carbon cap and trade credits, and renewable energy credit certificates sellable to power companies, among other incentives.

While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the invention only to the embodiments described.

FIG. 1 illustrates system architecture 100 according to one embodiment of the invention. Remote zone devices 101a-101n (hereinafter identified collectively as 101) may include temperature sensors, infrared sensors, thermostats, and meters, among other remote zone devices. According to one embodiment, one or more remote zone devices 101 may be assigned to a single user and may be programmed with user preferences. For example, one or more remote zone devices 101 may be assigned directly or indirectly to a user. Regarding indirect assignment, the remote zone devices 101 may be assigned to a room and the user may be assigned to the same room, thereby creating an association between the remote zone devices 101 and the user. When the user enters the assigned room, the system may configure the environment to the user preferences.

According to one embodiment, a plurality of sources may be provided to include on-demand sources 105a-105n (hereinafter identified collectively as 105), semi-on-demand sources 108a-108n (hereinafter identified collectively as 108) and intermittent sources 110a-110n (hereinafter identified collectively as 110). On-demand sources 105 may include any energy sources that may be activated upon a user's demand. For example, on-demand sources 105 include geothermal devices, boilers, furnaces, and heat pumps, among other on-demand sources. According to one embodiment, on-demand sources 105 may operate using energy sources such as electricity, natural gas, propane, gasoline, among other energy sources. On-demand sources 105 may include on-demand sensors 107a-107n (hereinafter identified collectively as 107) that measure properties or performance characteristics of system components for the on-demand sources 105.

Semi-on-demand sources 108 include any devices that may be activated and deactivated on demand, but that have features that differentiate them from on-demand sources. The features may include non-instantaneous production of desired results, such as delayed heating or cooling, among other features. For example, upon activation, semi-on-demand sources 108 may take an extended period of time to attain a desired temperature. Alternatively, upon deactivation, semi-on-demand sources 108 may have residual energy that may be directed to other sources or loads. Semi-on-demand sources 108 may include wood- or biomass-burning boilers and furnaces, among other semi-on-demand sources. Semi-on-demand sources 108 may include semi-on-demand sensors 109a-109n (hereinafter identified collectively as 109) that measure properties or performance characteristics of system components for the semi-on-demand sources 108.

By contrast, intermittent sources 110 include sources that are activated and deactivated upon the occurrence of events that are uncontrolled by the system 100. For example, intermittent sources 110 may include solar thermal sources (such as solar thermal panels), wind generators, manually operated furnaces, and co-generation devices, among other intermittent sources. Intermittent sources 110 may include intermittent sensors 112a-112n (hereinafter identified collectively as 112) that measure properties or performance characteristics of system components for the intermittent sources 110.

According to one embodiment, properties include component current consumption and voltage drops, among other properties. Performance characteristics include fluid flows, intake temperature readings, output temperature readings, preheat temperature readings, temperature rise at start-up, component revolutions per minute, and BTU meters readings, among other performance characteristics. System components include pumps, valves, boilers, furnaces, thermostats and aquastats, among other system components.

According to one embodiment, the properties and performance measurements may be analyzed to generate metrics, including failure diagnostics, energy capture, and usage optimization, among other metrics. The system 100 may be configured to allow remote diagnostics and remote troubleshooting of devices based on analysis of selected properties and monitored data, among other data. The system may log information automatically or on command, including system design, commissioning history, service history, and communication history, among other information.

According to one embodiment, the system 100 may include one or more design devices ("design devices"). The design devices 166 may include a processor, RAM, a USB interface, a wide area network (WAN) interface, a local area network (LAN) interface, an Internet interface, a hard disk, a wireless communication interface, a touch-screen display, a computer display, transmitter, receiver, among other components. The design devices 166 may include a computer server, personal computer and the like. The design devices 166 may store one or more software programs ("design programs") in memory containing one or more algorithms that when executed by a computer processor (CPU), designs a hydronic system schematic and generates configuration data that is used by the controller devices 130 to select rules to control and operate the hydronic system. The design devices 166 may also indicate to the user and/or installer the components of the hydronic system, connections to and from each component, and overall hydronic system configuration.

The design devices 166 may include a design devices interface 168 allowing a user and/or installer to enter data ("input data") into the design devices 166. The input data may include values, priorities and other criteria that may be processed by the design devices 166 to design the hydronic system schematic and produce the configuration data. For example, the input data may be used by the design programs to design a hydronic system by zones and/or to determine a corresponding set of hydronic components to incorporate in the hydronic system.

In particular, the input data may include local environment data, hydronic system requirements, physical restrictions and preferences, multiple loads data, multiple sources data, among other data. The local environments data may include climate information such as available insolation (radiant energy from the sun), geographical location, historical weather data and other information. Hydronic system requirements may include heat loss calculations for a structure, number of heating zones, types of heating zones, desired internal heating and cooling settings, hot water usage and other criteria. Physical restrictions and preferences may include percentage of heating needs supplied by renewable energy, physical space for renewable energy generation equipment, physical space and layout of room containing heating and cooling equipment, directional facing restrictions on outdoor renewable energy equipment, equipment mounting requirements and other criteria. Multiple loads data may include number of loads, energy usage of the loads and other data. Multiple sources data may include number of sources, type of source, kBTU output, energy efficiency of sources, and other data.

Figures 2A, 2B:
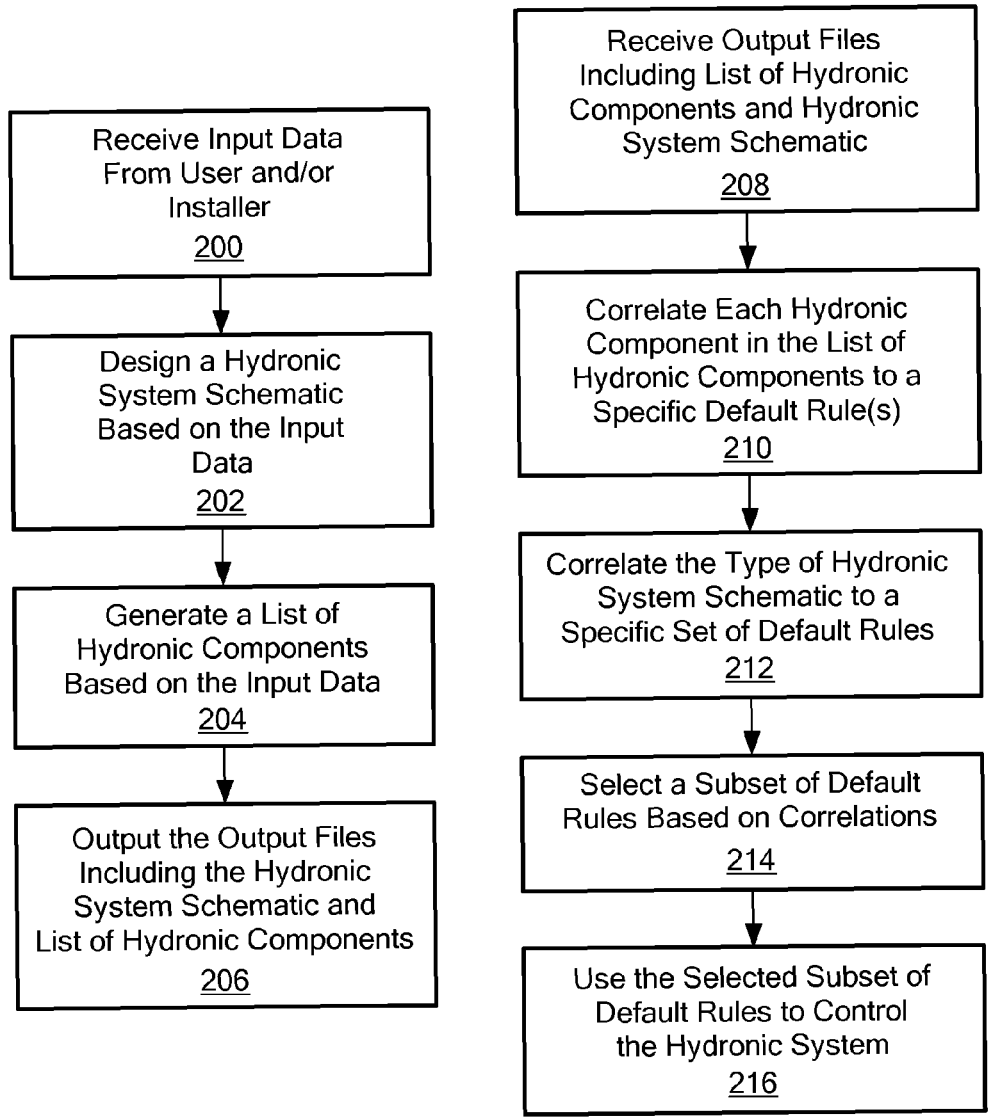
FIG. 2A illustrates a flow chart for the design process of the hydronic system.
FIG. 2B illustrates a flow chart for the process of selecting a subset of rules to control the hydronic system.

Referring to FIG. 2A, step 200, the design devices 166 may receive the input data via network 152 and/or manually at the design devices interface 168 from the user and/or installer. The design devices interface 168 may include an input screen interface, e.g. touchscreen, or a network interface allowing the user and/or installer to enter input data based on conditions in the field and/or on user preference, e.g. access the design devices interface via website. Moreover, the design devices interface 168 may include a device with a display that may communicate with the design devices 166 such as a mobile device, laptop computer, personal computer with display, Bluetooth device and the like. Moreover, the input data may also be provided manually to the design devices 166 via USB, removable memory card, and other communications methods known in the art.

Figure 3A:
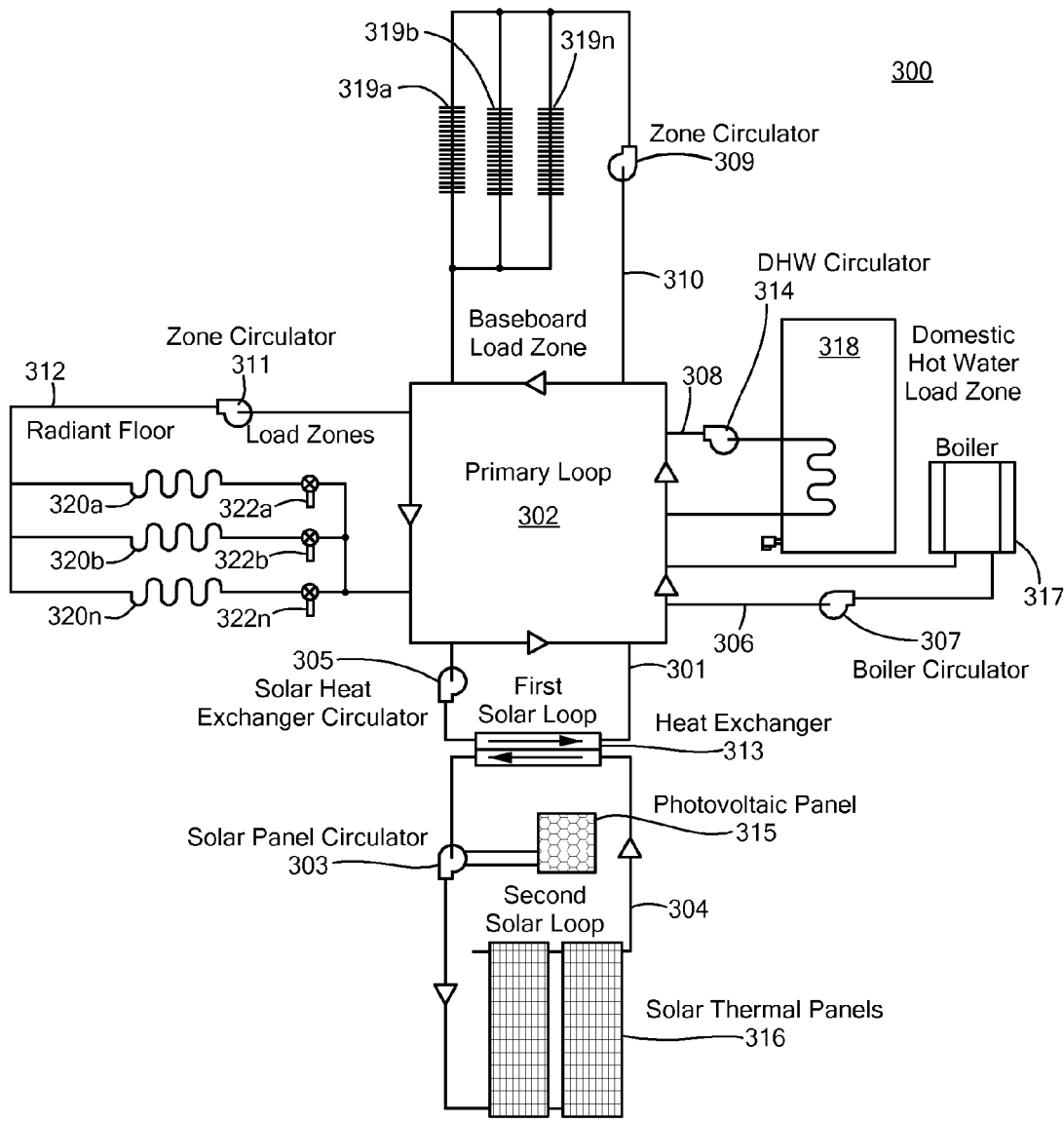
FIG. 3A illustrates a primary/secondary loop design for a hydronic system according to one embodiment of the invention.
Figure 3B:
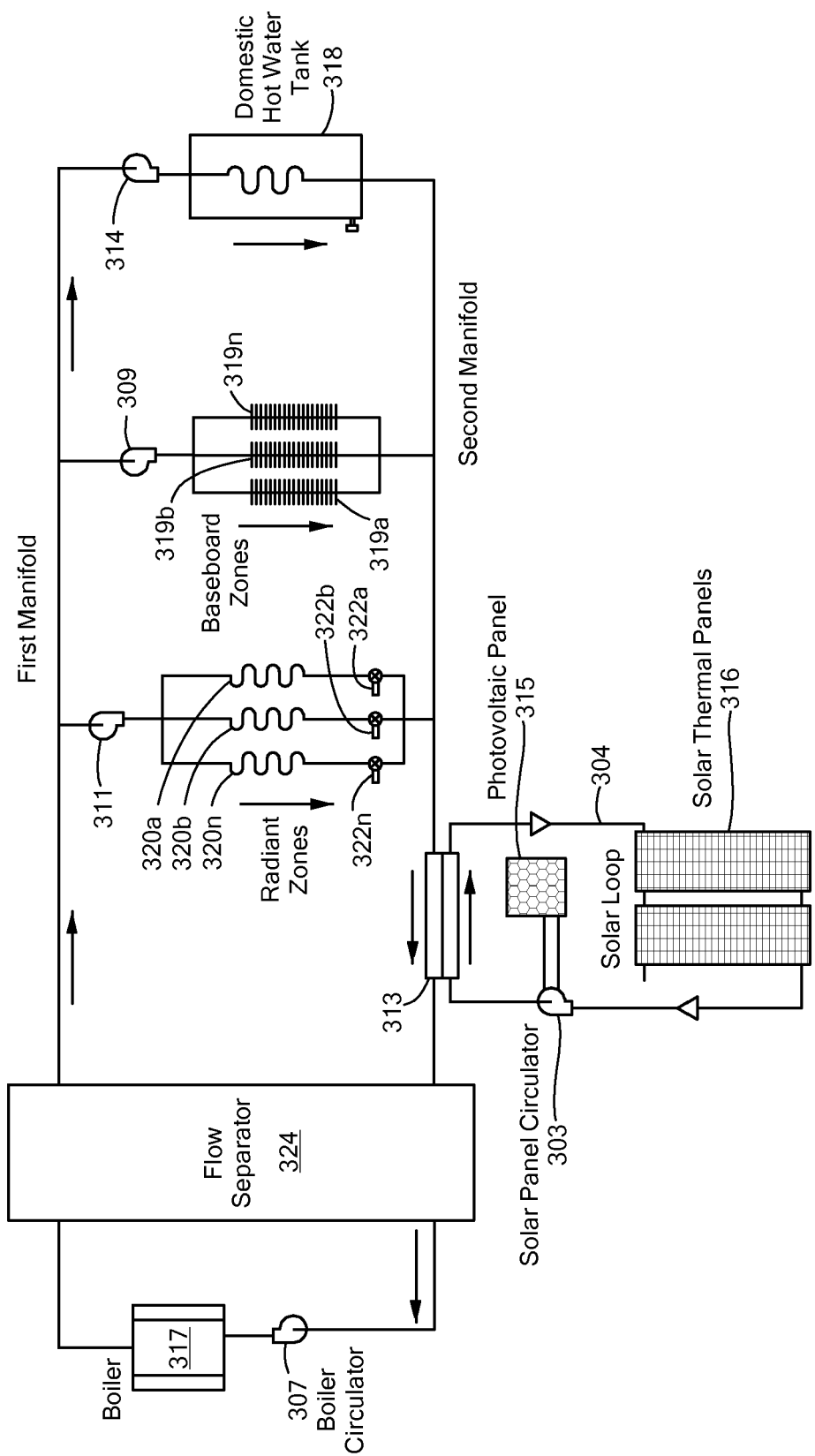
FIG. 3B illustrates a flow separator design for a hydronic system according to one embodiment of the invention.

FIG. 2A, step 202, illustrates the design programs process that may determine the hydronic system schematic, hydronic system configuration and hydronic components to incorporate in the hydronic system. The hydronic components may include components with properties that satisfy the input data specifications. For example, the components may include solar collectors, boilers, fluid pumps, valves, and the like, each having an energy usage rating, unit cost and the like, in which the user may require each component in the hydronic system to have a minimum energy usage rating. The design programs may also determine the hydronic system configuration to incorporate such as a primary/secondary loop principles configuration as shown in FIG. 3A, hydronic separator principles ("flow separator principles") configuration as shown in FIG. 3B, or other hydronic configurations that may be designed by zones. Both FIGS. 3A and 3B are discussed below. The design programs may also be directed by user input to incorporate a particular hydronic system configuration such as a primary/secondary loop principles configuration or a hydronic separator configuration. The design programs may also be directed by the user to specifically include or exclude certain components. This inclusion/exclusion feature may be useful for designs which are retrofits to existing hydronic systems and for which many components might already be installed.

In particular, the design programs may design the hydronic system schematic and configuration by loops, zones and sub-configurations (step 202). For example, the design programs may include predefined configuration schematics for multiple sources and multiple loads that may be incorporated into a hydronic system, among other schematic types. The predefined configuration schematics may include various heating loops such as loops including baseboards zones, warm floor (radiant) zones, pool or spa with heat exchanger zones, pool or spa with direct floor heat zones, and ice melt zones. The predefined configuration schematics may also include secondary loops and sub-configurations which themselves may include such major components as solar heat collector loops, large heat storage tanks, primary and secondary boilers, primary and secondary hot water heaters, primary and secondary hot water storage tanks, hot water recirculation sub-systems, heat exchangers and other loops and major components. In other words, the predefined configuration schematics may include a minimum arrangement of standard components for each loop, zone and sub-configuration. For example, a minimum arrangement of standard components for the baseboards zone loop may include at least one zone circulator, hydronic baseboards and a fluid path. In another example, a minimum arrangement of standard components for the warm floor zones loop may include a loop circulator, several fluid paths and control isolation valves on each path. In another example, a minimum arrangement of standard components for the solar collector loop sub-configuration may include a solar loop circulator, multiple solar collectors, several fluid paths, and a heat exchanger. In another example, a minimum arrangement of standard components for a variation of the solar collector loop sub-configuration may include several solar loop circulators, multiple solar collectors, several fluid paths, a heat exchanger and a heat exchanger circulator. The number of standard components in a minimum arrangement may vary once the design programs processes the input data. For example, the design programs may determine that three isolation valves, one zone circulator and three tubing paths are needed based on input data indicating a particular radiant area with three zones will be installed; however, the design program may increase the number of each component if the input data indicates a greater radiant area will be installed. In other words, each component in a respective predefined zone, loop, or major component sub-configuration schematic may be duplicated several times in order to meet the input data specifications required by the user.

The design programs may request the user and/or installer to enter specific information about each zone or component. The requested information about each zone may be used by the design programs to design the hydronic system, e.g. the requested information may determine the type of hydronic components and how many of each hydronic components are needed. For example, the area of warm floors information may be used by the design programs to determine the number of hydronic components needed to provide sufficient warmth, i.e. each component may supply enough warmth for a particular amount of area. In another example, the number of kBTU/hour information in order to heat the structure may be used by the design programs to determine the type and size of boiler needed in the hydronic system.

The baseboards zone loop design may incorporate the following information: total number of baseboard sections, remote manifolds and existing zone valves. The warm floors zone loop design may incorporate the following information: area of warm floor, remote manifolds, number of loops of tubing in each zone and existing zone valves. The pool zone design (with or without heat exchanger) may incorporate the following information: pool gallons, indoor or outdoor pool, and expected seasonal heat loads. The ice melt loop zone design may incorporate the following information: ice melt area. The solar heat collector sub-configuration design may incorporate the following information: need for overheat protection, roof mounted and available angle of mounting (flat or pitched), wall mount, ground mount and trench length to the collectors. The large heat storage tank component design may incorporate the following information: maximum number of tanks and maximum number of gallons for each tank. The primary boiler zone design may incorporate the following information: existing boiler, type of fuel, number of kBTU/hour output. The hot water storage design may incorporate the following information: expected gallons of hot water use per day; legal requirements for single- or double-walled heat exchanger, desired minimum hot water temperature. The hot water recirculation sub-system design may incorporate the following information: existing system and size of recirculator pump (watts). The solar heat collector sub-configuration design may incorporate the following information: heat exchanger or direct connection. In other words, the design programs may request the user and/or installer enter information regarding or to be incorporated into each sub-system, major component, comfort preference, zone and/or zone loop.

Moreover, the design programs may also take into account input data regarding existing components located at a hydronic system installation site, e.g. existing fluid pipes, primary boiler and the like may already be located in the building. In particular, the design programs may automatically include particular zone components in the designed hydronic system unless the input data indicates that those components are already installed.

The design programs may also calculate the total heated area, mass radiant area, low-mass radiant area, heated garage area and snow melt area based on the requested information about the zones or this information may be input by the user and/or installer. The total heated area in conjunction with weather data and structure heat loss data may be used by the design programs to determine a recommended number of solar panels and/or the mounting angles of the solar panels. The design programs may use the mass radiant area and the low-mass radiant area to determine how much heat storage (how many gallons of heat storage tanks) is required. The heated garage area and the snow melt area may be used by the design programs to determine the amount of heat storage buffer needed to store unused heat in the non-heating season months, e.g. size and/or number of water tanks used to store unused heat.

Moreover, referring to FIG. 2A, step 202, the design programs may determine the type of hydronic system to implement based in part on the requested information about each zone and sub-configuration. For example, if the sub-configurations, loops and zones being installed have access to only one existing fluid conduit, the design program may determine that a primary/secondary loop configuration is the best suited design, e.g. a primary/secondary loop configuration requires access to only one fluid conduit as opposed to a flow separator configuration that requires access to two fluid conduits. Other input data provided by the user such as cost, construction time and the like may also be used by the design program to determine the particular hydronic system configuration to implement. For example, the design programs may select a primary/secondary loop configuration because the flow separator configuration may have a longer construction time than the primary/secondary loop configuration. Alternatively, the user and/or installer may manually select the type of hydronic configuration to implement, i.e. the input data directs the design programs to design a specific type of hydronic system: primary/secondary or flow separator. In other words, the totality of the user inputs may determine the hydronic system configuration, e.g. may determine sub-configurations including number of banks of solar panels, how many panels in each bank, types of solar collectors, number of heat distribution manifolds, number and size of heat storage tanks, number and size of domestic hot water tanks, size of plate heat exchanger, number of zones, number of zone values and the like.

The design programs may also use default information stored in the design devices 166 to design the hydronic system (step 202). The default information may include any input data that is used by the design programs to design the hydronic system. For example, the design devices 166 may store default input data of an average single family home such as heat loss to floor area ratio, average hot water use per person, and the like. This default information may be used by the design devices 166 if the user and/or installer fail to provide certain requested information. For example, the installer indicates that solar panels are included in the system but fails to give the amount of expected home heat energy usage. The design programs may substitute a default average energy usage value for a single family home by using the floor area and the default heat loss ratio for the missing information when designing the hydronic arrangement. In particular, the design programs may determine that two banks of solar panels are needed to provide the solar component of the default average energy usage value for a home located in the northeast of the United States having a high default heat loss ratio, based on the average amount of energy during a winter's day sunlight hours that each square foot of solar collector can provide. As such, the design programs may design the hydronic system even though the user and/or installer fail to input all the requested information.

Moreover, referring to FIG. 2A, step 204, the design programs may generate a list of major hydronic components based on the input data. The list of hydronic components may specify the manufacturer, manufacturer part number, quantity and other information related to each major hydronic component in the hydronic system. Also, the list of hydronic components chosen may be based on predefined criteria such as manufacturer preference, energy usage rating and other criteria. For example, the hydronic system requires a boiler, and two boilers are available from different manufactures, both of which meet the required specifications for the system, e.g. energy output rating. In this instance, the design programs may give priority to one manufacturer over another based on predefined manufacturer preference, thereby selecting a particular boiler to include in the list of hydronic components.

The design programs may also optimize the hydronic system schematic (step 202) and the list of hydronic components (step 204) based on a certain predefined criteria such as solar energy estimation, energy efficient component maximization, radiant floor zone optimization, among other optimizations or maximizations that may be selected by the user and/or installer. For example, a solar energy maximization criteria may instruct the design programs to include no more than a certain number of solar panels that will fit at the location or alternatively an optimization criteria may instruct the program to include enough solar panels to provide a certain expected percentage of energy usage. The energy efficient component maximization may instruct the design program to design the hydronic system using hydronic components meeting a certain energy efficiency rating. In other words, the design programs may optimize the designed hydronic system based on predefined criteria that is stored in the design devices and may be selected by the user and/or installer.

Referring to FIG. 2A (step 206) and FIG. 2B (step 208), the design programs may output one or more files ("output files") that may be transmitted or uploaded by the design devices 166 to the controller devices 130. For example, the transmission of these files may take place over the internet, by direct computer-to-computer wires, over a local area network, or through a physical memory storage device such as an SD card, a USB flash drive, or other common physical storage device. The transmission of these files may take place in substantially real time or as a sequence wherein the files are temporarily stored and then later transmitted to the controller devices. The transmission of these files may also involve the use and temporary storage of the files on an additional computer such as a server. As such, the output files may be transmitted or uploaded to the controller devices via various transmission methods known in the art.

As an example, FIG. 1 shows a system in which the file transmission takes place in essentially real time. The design devices transmit the output files to the network or internet, from which the controller devices receives the output files. In FIG. 1, the controller device is already installed in the hydronic apparatus; however, the design devices may also transmit the output files to the controller devices before the controller is installed in the hydronic apparatus. In other words, even though the controller devices receive the output files in substantially real time, the controller is not installed in the hydronic apparatus at the time of receiving the output files.

In particular, the communication between the design devices and the controller devices may occur directly or indirectly via communications methods known in the art. For example, the design devices may transmit the output files to a storage element including a configuration storage device, a computer or a physical device such as a memory storage card, external hard drive and the like. The received output files may be stored on these storage elements until the output files are transmitted to the controller devices at a later time via communication methods known in the art, e.g. internet, network. Also, at the time of receiving the output files from the storage element, the controller devices may or may not yet be installed in the hydronic apparatus. One of ordinary skill in the art will recognize that there are many variations in the art for transmitting, storing and receiving information and files from one computer to another, and the examples given are not meant to limit the transmission method or timing of file and information transmission from the design devices to the controller devices.

The output files may include a mapping file a components file, and a schematic drawing file, among other files. The mapping file may the list of major hydronic components information defining the hydronic system schematic, system usage preferences determined by the user or installer and other information. The components file located within the output files may include the list of hydronic components and may include all or some of the components being utilized in the hydronic system. For example, the components file list may include major components, all components, or the like.

Another file located within the output files may be an actual drawing of the hydronic system schematic in any of the common file formats. Such formats may include CAD, pdf, jpeg, tiff, or other drawing formats. The hydronic system schematic may include a schematic diagram indicating the connections to and from all or some of the hydronic components in the hydronic system, e.g. connections to and from multiple predefined loop, zone and sub-configuration schematics. For example, the schematic diagram may include a plumbing diagram or other diagram(s) indicating the component connections in the hydronic system. The indicated connection types may include fluid, electrical and the like.

According to one embodiment, the system 100 may include one or more controller devices 130. The controller devices 130 may include a processor 131, RAM 132, a USB interface, an actuator interface 134, a thermostat interface 135, a sensor interface 136, a wide area network (WAN) interface, a local area network (LAN) interface, an Internet interface, a hard disk, a wireless communication interface, a touch-screen display, a ranking interface, and a computer display, among other components. The thermostat interface 135 receives preselected values from thermostats positioned in at least one of the plurality of load zones and may send information to thermostats. The sensor interface 136 receives real-time values from sensors in the system such as the plurality of load zones, the plurality of sources, and system components such as aquastats positioned on domestic hot water tanks. The actuator interface 134 sends actuating signals to system components such as motorized valves and pumps to couple or decouple zones and sources as desired. The actuator interface may also receive real-time performance measurements from system components under its control.

Referring to FIG. 2B, the controller devices 130 may communicate with the design devices 166 to receive the output files from the design devices 166 via the internet, computer-to-computer wiring, a LAN network or a physical memory device (step 208). The controller devices 130 may process the received output files to determine the rules needed to control the hydronic system (steps 210-214). The processing of the output files by the controller devices 130 is discussed below.

The controller devices 130 may also communicate with devices, including the on-demand sources 105, the on-demand sensors 107, the semi-on-demand sources 108, the semi-on-demand sensors 109, the intermittent sources 110, the intermittent sensors 112, the loads 115, the load sensors 117, the remote zone devices 101, user interfaces 150, the network 152, terminal devices 157, mobile devices 159, and/or other devices. According to one embodiment, the controller devices 130 may identify a device using an identification handshake.

According to one embodiment, the controller devices 130 may include, or be modified to include, software modules that may provide control functions. The software may be updated over the network 152, such as the Internet. The controller devices 130 may include one or more software agents that coordinate data capture, data storage and execution of rule sets. The captured data may be stored locally at the controller devices 130, remotely on a peripheral device, or sent to another computer or device via a LAN or the Internet.

The controller devices 130 may have rule sets ("default rules") stored in memory that control different types of hydronic system configurations and hydronic components. The default rules may be uploaded to the controller by a manufacturer, supplier and/or installer. The default rules may be used by the controller to operate any system from the minimum to the maximum hydronic system configurations. A minimum hydronic system configuration may include the least amount of hydronic components. A maximum hydronic system configuration may include the greatest amount of hydronic components. For example, the controller devices 130 may use a subset of default rules to operate the hydronic systems of FIG. 3A and FIG. 3B. In particular, a subset of default rules may be used by the controller devices 130 to control and operate the hydronic system in FIG. 3A, while a different, same or combination subset thereof of default rules may be used to operate the hydronic system in FIG. 3B.

Moreover, the default rules may control how each hydronic component in the hydronic system operates, including when to activate or deactivate a component, thermally couple or decouple loads, thermally couple or decouple sources and the like. For example, a hydronic component may correspond to a specific subset of default rules that are used to control and operate the hydronic component, e.g. a primary boiler may require the use of a specific subset of default rules. The default rules may also include component configurations, system optimization settings, system trouble shooting and other rule settings.

The controller devices 130 may include a configuration program, illustrated in FIG. 2B, stored in memory that when executed by the CPU 131, may process the output files, e.g. processes the mapping file, the hydronic system schematic, and/or the list of hydronic components, and may determine a subset of default rules to control the hydronic system based on the information in the output files (steps 208-212). For example, the configuration program may determine that a hydronic system incorporating non-mass radiant zones and a large heat storage tank may require the use of a specific subset of default rules in order to control and operate the storage tank.

Still referring to FIG. 2B, the configuration program processes at least one of the output files to determine the subset of default rules that govern control of the hydronic system, i.e. the configuration program correlates the output files to a specific subset of default rules that are used to control and operate the hydronic system (steps 210-216). For example, the configuration program may determine, based on the output files, the default rules used to operate an ice melt loop zone are not needed because the hydronic system schematic does not indicate this zone is included in the hydronic system. Also, the list of components may indicate the hydronic components in the ice melt zone are not included in the hydronic system, and therefore that no ice melt zone is incorporated into the hydronic system. Continuing the example, the configuration program may also determine a specific subset of defaults rules are needed to operate the solar heat collector loop based on the hydronic system schematic and/or list of hydronic components that indicate the loop is included in the hydronic system.

In particular, a specific subset of default rules may correspond to a specific hydronic component. For example, a solar panel circulator 303 may correspond to a specific subset of default rules that governs its behavior in the hydronic system. The configuration program may also determine the configuration for the solar loop collectors based on the output files. For example, the list of hydronic components may indicate that there are two banks of solar panels, each with its own circulator pump, requiring a specific subject of default rules for each of the bank of solar panels and a separate subset of default rules for the other hydronic components. Also, the control of a single hydronic component may correspond to several subsets of default rules that define its behavior in the system. The configuration program may decide which of the above subsets of default rules to use based on information in the mapping file, which in turn may be provided by the user interacting with the design devices, e.g. interacting via the design devices interface.

In another example, the output files may include a hydronic system schematic indicating that there are both mass radiant floors and non-mass radiant floors. The configuration program may select one subset of default rules to govern the system response to the room thermostats for the mass zones and a different subset of default rules to govern the system response to the room thermostats for the non-mass zones (step 212). In yet another example, the output files may indicate that the user preference is to use solar heat for space heating rather than using it for hot water. In this case the configuration program would use a subset of default rules to apply stored solar heat to the space heating needs and not use it to make domestic hot water. In other words, the hydronic system schematic indicating a certain hydronic configuration may correlate to a specific subset of defaults rules that control and operate the configuration, while another configuration may require a different or overlapping subset of default rules.

Referring to FIG. 2B, step 214, the design programs selects a subset of default rules that are needed to control and operate the hydronic apparatus based on the correlations of steps 210 and 212. These subsets of the default rules may be used in a variety of combinations, running synchronously to provide coordinated operation of one or more components, or running independently to provide control of a chosen component uncorrelated to other system functions. For example, the configuration program in the controller may use a subset of default rules to turn the circulator in the solar collector loop on and off dependent solely on the temperature of the collectors. On the other hand, the configuration program may use a different subset of default rules to turn the circulator on and off dependent on the temperature of the solar collectors and the temperature of the fluid paths near the heat exchanger in the summer but not in the winter.

Therefore, the configuration program may direct the controller devices 130 to use specific default rules while ignoring others based on the information received in the output files (step 216). Moreover, the process illustrated in FIG. 2B may initiate upon system start-up. For example, the configuration program may run every time the hydronic system boots up, upon initial installation, when initiated by the user and/or installer, or the like.

Moreover, the output files may contain new hydronic system configuration information that may be processed by the controller devices 130 to control the components and configuration of the hydronic system. For example, the controller devices 130 may process, store and apply new configuration information to control a hydronic system that has been modified after installation. In particular, equipment in the hydronic system may be added and/or removed in order to: upgrade to newer or more efficient equipment, expand the number of solar collectors, add heating zones, add more sensors and the like. Accordingly, the controller devices 130 may update the default rules as new equipment is added by receiving output file updates from the design devices 166.

The controller devices 130 may include a parameters file that contains predefined values used by the controller devices 130 during initiation and/or routine operation. Moreover, the output files transmitted from the design devices to the controller devices may include a default parameters file which may be used by the controller devices upon first startup and which may be later modified by a user or installer. For example, the parameters file may include threshold values, preselected values, heating load priorities, heating source priorities, other values and other priorities. In particular, the software modules in the controller devices 130 may use one or more predefined values and/or priorities stored in the parameters file to perform its respective function, i.e. a software module may access values from the parameters file during operation to perform its particular function. The specific functions of each software module are discussed below. The values in the parameters file may also be reconfigured by the user or the installer via network 152, updated locally at the controller by the user and/or installer, and by other communication methods known in the art.

With reference to FIG. 1, the controller devices 130 may be of modular construction to facilitate adding, deleting, updating and/or amending modules therein and/or features within modules. Modules may include a monitoring module 160, an alert module 161, a ranking module 162, a trigger module 163, an actuator module 164, and a temperature setpoint module 165, among other modules. The monitoring module 160 monitors sensor data in substantially real-time, including on-demand sensor data, semi-on-demand sensor data, intermittent sensor data, source sensor data and load sensor data, among other sensor data. The alert module 161 may generate alert signals if the sensor data is different from predefined sensor threshold values. For example, the alert module 161 may generate alert signals if the source sensor data is different from predefined source sensor threshold values.

The ranking module 162 applies ranking criteria to rank the plurality of sources 105,108,110 and the plurality of loads 115. According to one embodiment, the ranking module 162 may rank the sources 105,108,110 according to source criteria, such as availability, unit cost of producing energy, temperature of source fluid, energy flux available from a source, and unit carbon emissions associated with a source, among other source criteria. The unit cost of producing energy, for example, may vary depending on the type of natural resource and the time of day.

The ranking module 162 may employ rules, e.g. default rules, to rank the loads 115 according to load criteria, such as temperature needed for heating, energy flux needed for heating, priority of the heat load, and the total energy needed to attain a desired temperature, among other load criteria. The heat load priority may be associated with user comfort and may include absolute priorities and relative priorities. The ranking module 162 may apply absolute priority rules, to select heat loads that receive heat energy before other heat loads. For example, the ranking module 162 may specify an absolute priority that the sources 105,108,110 maintain predefined water temperatures in hot water heaters before directing the sources 105,108,110 to maintain predefined temperatures in an interior space, such as a room. The ranking module 162 may apply relative priorities to select heat distribution among loads based on user impact. For example, users may notice a larger decrease in comfort if a room temperature varies from a predefined setpoint value compared to if a swimming pool temperature varies from a predefined setpoint value. Therefore, if the temperature of two loads varies from corresponding setpoint values, then the ranking module 162 may apply relative priority rules to direct the sources 105, 108,110 to apply energy to maintain an interior space temperature at the setpoint value before applying energy to maintain the swimming pool temperature at the setpoint value. Regarding the total energy needed to bring a heat load to a desired temperature, the ranking module 162 may rank loads based on whether the load medium is a gas or liquid. In other words, the ranking module 162 may calculate energy requirements depending on whether a source 105,108,110 is requested to adjust the temperature of a gas, such as room air, or a liquid such as a swimming pool. The ranking module is configured to perform dynamic calculations based on criteria obtained from various devices, including the on-demand sources 105, the semi-on-demand sources 108, the intermittent sources 110 and the loads, among other devices.

The trigger module 163 may generate a trigger signal if the preselected values that are received from at least one of the plurality of load zones are different from the measured properties received from the corresponding load zone. The actuator module 164 communicates with the alert module 161, the ranking module 162 and the trigger module 163 and generates a control signal to fluidly or thermally couple selected ones of the plurality of sources to selected ones of the plurality of loads 115, or to fluidly decouple the plurality of sources or loads. The actuator module 164 may fluidly or thermally couple selected ones of the plurality of sources to the heat storage device when the alert module 161 generates the alert signal and the trigger module 163 fails to generate the trigger signal. According to one embodiment, during normal operation, the actuator module 164 decouples the plurality of sources when the alert module 161 fails to generate the alert signal and the trigger module 163 fails to generate the trigger signal. The temperature setpoint module 165 may include stored preset values for the load zones. The preset values may be adjusted by communicating with components, including the thermostat interface 135, the user interface 150, the remote devices 101, the mobile devices 159, and the terminal devices 157, among other components. The preset values may represent various conditions under which the system 100 is intended to operate. For example, the temperature setpoint module 165 may include normal mode preset values and different vacation mode preset values.

In vacation mode, the system 100 may operate so that the on-demand sources 105 are deactivated, unless extreme or undesirable conditions occur. For example, the on-demand sources 105 may remain deactivated unless adverse conditions arise, such as temperature conditions falling to levels that risk freezing water pipes, among other adverse conditions. According to one embodiment, the temperature setpoint module 165 and the thermostat interface 135 may communicate to override preset values when operating in the vacation mode. In other words, regardless of whether the thermostat generates a heat request, selected trigger signals may be set or reset during the vacation mode according to preset vacation mode values.

According to one embodiment, the temperature setpoint module 165 may include temperature settings for the semi-on-demand sources 108 and the intermittent sources 110. The temperature setpoint module 165 may communicate with the trigger module 163 to control the semi-on-demand sources 108 and the intermittent sources 110. If the target heat load 115 terminates a heat request, then the semi-on-demand source 110 may be deactivated. The temperature setpoint module 165 may detect residual heat remaining in the semi-on-demand source 110 and may communicate with the trigger module 163 to generate a trigger signal coupling the semi-on-demand source 110 to another load 115, even though the other load is not requesting heat. For example, the residual heat may be diverted to in-mass floors. Applying residual heat to in-mass floors does not noticeably alter room temperature because the floor mass is relatively large. The residual heat is gradually dissipated into the room as the room air cools, such as in the evening. In other words, selected loads may be used to store residual heat, thereby minimizing waste. The system 100 may include a plurality of loads for storing residual heat.

It should be readily understood that a greater or lesser number of modules might be used. One skilled in the art will readily appreciate that the invention may be implemented using individual modules, a single module that incorporates the features of two or more separately described modules, individual software programs, and/or a single software program.

According to one embodiment, communications may occur between the various devices of the system 100 via network 152. According to another embodiment, network 152 may include the Internet. Alternatively, the devices may communicate via non-network communications media 153, such as, for example, any wired or wireless media. Communications may occur substantially in real-time, on command, or at predetermined intervals. One of ordinary skill in the art will appreciate that communications may be conducted in various ways and among various devices.

Terminal device 157, mobile device 159, and user interface 150 may include any number of different types of devices, such as personal computers, laptops, smart terminals, personal digital assistants (PDAs), cell phones, Web TV systems, video game consoles, touch screen terminals, keypads, kiosks, or devices that combine the functionality of one or more of the foregoing or other client terminal devices. Furthermore, terminal device 157, mobile device 159 and user interface 150 may be manipulated by positioning an indicator over selected icons using a touch-sensitive display screen or a mouse, a keyboard, a voice recognition system or other input receiving devices. User interface 150 may provide a central access point to controller devices 130 in order to control an entire user space, such as a home. User interface 150 may include a touch-sensitive display screen and may be combined with an audio input device.

According to one embodiment, terminal device 157 and mobile device 159 may provide users and system installers with remote access to the system 100. The remote access may include reviewing interacting parameters to confirm optimized operating zones, viewing logged data, or placing the system in predetermined operating conditions for diagnostic purposes. If needed, the system may automatically adjust or allow manual adjustment of interacting parameters.

The invention may automatically authenticate users that are associated with the terminal devices 157 or mobile devices 159. Alternatively, the system 100 may require users that desire to access the controller devices 130 through an unknown device to be authenticated before being granted remote access. If users are not authenticated, then the users may be invited to submit requested information or take other action. If the user is authenticated, then system 100 may perform other processing. For example, controller devices 130 may load data or perform other functions (e.g., produce hot water).

With regard to user authentication, one of several different authentication schemes may be employed, and would be appreciated by those skilled in the art. For example, the user may be asked to input an alphanumeric code. Alternatively, the user may be asked to provide biometric information (i.e., a thumbprint through a fingerprint scanner) or other suitable identifying information.

Loads 115a-115n (hereinafter identified collectively as 115) may represent destinations for the heating fluid, including living spaces, pools, spas, walk ways, gardens, ice melt areas and driveways, among other destination. Users may prioritize the loads 115 and may assign the loads to selected sources. For example, if the load 115, such as a pool or an ice melt area, is designated a non-essential load, then the system may assign intermittent sources 110 to these load 115. An ice melt area may be assigned to intermittent sources 110, such as solar heat sources, or low-cost, low-temperature on-demand heat source, such as geothermal sources. The ice melt area may be prevented from using (or being assigned) more expensive on-demand sources 105, such as propane or electric sources, among other more expensive on-demand sources 105.

Additionally, if intermittent sources 110, such as solar heat, are not available due to overcast conditions, then the system may make real-time decisions to divert the geothermal source from a lower priority load, such as the ice melt area, to a higher priority load, such as space heating. Ranking priorities may be changed permanently or dynamically for the various loads 115 as conditions change. According to one embodiment, the ranking priorities may be changed using the user interface 150, the mobile devices 159, the terminal devices 157, devices over the network, or other devices.

Additionally, any loads 115 that are associated with living spaces or domestic hot water, for example, may be assigned a highest priority. As a result, the intermittent sources 110 and semi-on-demand sources 108 initially may be programmed to satisfy high priority loads, such as living spaces or domestic hot water. If any heat remains at the intermittent sources 110 and the semi-on-demand sources 108, then the heat associated with these sources may be diverted to the lower priority loads, such as a pool. According to one embodiment, the controller devices 130 may be programmed so that on-demand sources 105 are not used to heat low priority loads.

According to one embodiment, the controller devices 130 may analyze the data associated with load sensors 117a-117n (hereinafter identified collectively as 117), the on-demand sensors 107, the semi-on-demand sensors 109 and the intermittent sensors 112. The controller devices 130 may compare the actual data, the theoretical data and the user preferences of how the loads 115 are heated relative to how the respective on-demand sources 105, semi-on-demand sources 108 and intermittent sources 110 performed.

Based on results of the comparison, the controller devices 130 may modify device settings to align predicted actual data with the theoretical data and the user preferences. The controller devices 130 may be programmed to enable system expansion, including increasing the number and type of sources and loads, without changing the basic system software or hardware. For example, the controller devices 130 may be programmed to modify device parameters.

FIG. 3A illustrates an exemplary embodiment of a system layout 300 having a primary loop 302 and secondary loops having multiple connections. The secondary loops include sources, such as solar loop 304 and boiler loop 306. The secondary loops also include loads, such as baseboard loop 310 and radiant floor loop 312. Furthermore, the secondary loops may include combined sources and loads, such as domestic hot water loop 308, which acts as both a source that supplies heated fluid and a load that receives heated fluid.

According to one embodiment, the secondary loops 304, 306, 308, 310 and 312 may be connected to the primary loop 302 using a plurality of pipes. For example, the connections may be accomplished using two pipes. The primary loop 302 may employ a primary pump or may be designed with check valves that allow primary circulation to be driven by secondary pumps.

FIG. 3A illustrates the primary loop 302 and the secondary loops 304, 306, 308, 310 and 312 configured as spokes around a wheel, with a central hub (primary) surrounded by the secondary loop modules. The solar loop 304 may include a first solar loop 301 having a solar heat exchange circulator 305. A second solar loop 304 may be coupled to the first solar loop through a heat exchanger 313. The second solar loop 304 includes a solar panel circulator 303, a photovoltaic panel 315 and solar thermal panels 316. The boiler loop 306 includes a boiler circulator 307 and boiler 317. The domestic hot water loop 308 includes a domestic hot water (DHW) circulator 314 and a domestic hot water tank 318. The baseboard loop 310 includes a zone circulator 309 and baseboards 319a-319n. The radiant floor loop 312 includes zone circulator 311, tubing 320a-320n and controllable isolation valves 322a-322n.

When using a primary loop design, the hot supply fluid typically mixes with the cooler return fluid as it flows around the loop, resulting in a progressive temperature drop. While FIG. 3A illustrates a counterclockwise direction, one skilled in the art will readily appreciate that a clockwise direction may be used. The secondary loops 304, 306, 308, 310 and 312 may be arranged to take advantage of this temperature decline, by arranging piping clusters in order of thermal requirements. In other words, the domestic water tank 318 is positioned closest to the heat source boiler 317 to receive the hottest fluid. The remaining heating loads are arranged around the primary loop in order of declining temperature necessity. FIG. 3A demonstrates this temperature staging by showing the boiler 306 feeding the domestic hot water (DHW) tank 318 first, then the hydronic baseboards 319a-319n, then the radiant floors 320a-320n.

According to one embodiment, the source loops and the load loops may be decoupled using controllable isolation valves 322a-322n, as shown in the radiant floor zones 312. Alternatively, the source loops and the load loops may be uncoupled using a pump in place of an isolation valve. For example, pumps may include the boiler circulator 307, the DHW circulator 314, the zone circulators 309,311 and the solar heat exchange circulator 305. When using pumps to uncouple loops, the flow resistance of inactive pumps effectively stops fluid flow and heat transfer.

FIG. 3A illustrates a heat exchanger 313 that transmits heat between the second solar loop 304 and the first solar loop 301. The heat exchanger 313 allows the fluid in the first solar loop 301 to be different than the fluid in the second solar loop 304. For example, the fluid circulating in the second solar loop 304 may contain a mix of water and anti-freeze, whereas the fluid circulating in the first solar loop 301 and the primary loop 302 may be water. Other fluids may be used. In this case, the second solar loop 304 remains fluidly isolated from the other fluid loops, but is thermally coupled or decoupled from the primary loop 302 by turning the solar heat exchanger circulator 305 and the solar panel circulator 303 on or off in tandem, as desired.

According to one embodiment, if solar heat is adequate to supply the heat energy requirements of the loads requesting heat, then the boiler loop 306 is decoupled or uncoupled from the primary loop 302. The boiler loop 306 may be uncoupled from the primary loop 302 by turning off the boiler circulator 307. Additionally, heat flowing in the second solar loop 304 may be used to preheat fluid in the primary loop 302 before the fluid is directed into the boiler loop 306. The invention takes temperature order into consideration and provides a preferred order for piping connections, including providing priority control options as needed. The secondary loops typically employ a pump and other plumbing components, including check valves, isolation (ball) valves, mixing valves, temperature gauges, pump unions, and other components as needed by the heating load.

The invention is compatible with other heating functions and controls, including but not limited to room thermostats using one or two stage heating or cooling, programmable room thermostats, wireless room thermostats, building energy control systems, remote monitoring or data logging systems, and/or remote program adjustment. One or more optional hydronic cooling sub-systems such as radiant night sky cooling radiators, multi-stage evaporative cooled hydronic fluid, reverse heat-pump cooled liquid, and/or liquid to air duct cooling heat exchangers and the appropriate controls may also be employed. In particular, the invention provides hydronic systems that may be used both as heating systems and cooling systems.

When used for cooling, the role of the heat loads and sources is typically reversed. Heat is taken from selected load zones and transferred via the system to either another load zone, or to a heat source, or a cooling sub-system. Other heating sources and their related components and controls may optionally be employed, such as a wood-fired hydronic boiler (with or without water heat storage tank), a ground source heat pump, a waste heat recovery (co-generation), drain down solar collector systems, and/or other solar heat collector types. In addition, other heating load systems, components and controls may be used, including but not limited to a heat storage device with external heat exchanger and/or heat storage devices with one or more internal heat exchangers. A common heat storage device includes one or more water tanks with internal or external heat exchangers. These techniques and devices are known to those skilled in the art. The invention also may be used to control and optimize waste heat recovery, where the waste heat is produced as a consequence of cooling another zone. For example, when cooling a zone such as a computer room, the cooling equipment of that room produces waste heat and can be treated as a relatively low-temperature intermittent heat source by the heating system.

FIG. 3B illustrates a flow separator system design including central fluid loop, flow separator 324, first manifold (e.g. hot manifold), second manifold (e.g. cold manifold) and secondary flow paths. The boiler path includes boiler circulator 307 and boiler 317. The radiant floor path includes zone circulator 311, tubing 320a-320n and controllable isolation valves 322a-322n. The baseboard path includes a zone circulator 309 and baseboards 319a-319n. The domestic hot water path includes a domestic hot water circulator 314 and a domestic hot water tank 318 (DHW). The solar loop includes a single solar loop coupled to the central circuit through the heat exchanger 313. The solar loop includes a solar panel circulator 303, a photovoltaic panel 315 and solar collector thermal panels 316.

During flow separator design operation, the fluid fed to the first manifold (e.g., hot fluid manifold) is delivered directly from the top of the flow separator. The liquid in the top of the flow separator is made hot by one of three methods: from the solar loop if the boiler is off and there is sunshine, from the boiler if the boiler is on and there is no sunshine, or from the combination of the solar loop and the boiler if there is sunshine and the boiler is on. Thus, each secondary flow path receives a similar temperature supply fluid. In particular, this design prevents direct fluid mixing between the first (e.g. hot) and the second (e.g. cold) manifolds, and each secondary path may provide the hottest fluid available from the first manifold, irrespective of the heat load demands of other secondary paths.

According to one embodiment, the secondary paths may be decoupled from the heat sources using controllable isolation valves 322a-322n, as shown in the radiant floor zones. Alternatively, the secondary paths may be uncoupled using individual circulation pumps in place of the isolation valves 322a-322n and simultaneously eliminating the zone circulator 311. For other sources and loads, pumps are commonly used to couple and decouple them from the central fluid circuit. For example, in FIGS. 3A, 3B, the boiler circulator 307, the DHW circulator 314, and the zone circulator 309 are used in this manner. When using pumps to uncouple paths and loops, the flow resistance of inactive pumps effectively stops fluid flow and heat transfer.

FIG. 3B illustrates a heat exchanger 313 directly coupled to the second manifold. The heat exchanger operates in substantially the same manner as discussed with reference to FIG. 3A, except that the first solar loop may not be required. In other words, the heat exchanger may be directly coupled to the central fluid loop so as to pre-heat all of the supply fluid before reaching the boiler if the solar panel circulator 303 is active. In contrast, the first and second solar loops of FIG. 3A couple the solar thermal panels to the primary loop so as to heat or pre-heat only a fraction of the fluid circulating in the primary loop. Furthermore, either coupling method may be used to couple the solar thermal panels to either the primary loop or the central fluid circuit of FIGS. 3A and 3B, respectively.

According to one embodiment, if solar heat is adequate to supply the heat energy requirements of the loads requesting heat, then the boiler path is decoupled or uncoupled from the central fluid loop. The boiler path may be uncoupled from the central fluid loop by turning off the boiler circulator 307. The secondary paths providing fluid to the heat loads typically employ a pump and other plumbing components, including check valves, isolation valves, mixing valves, temperature gauges, pump unions, and other components as needed by the heating loads.

Figure 4:
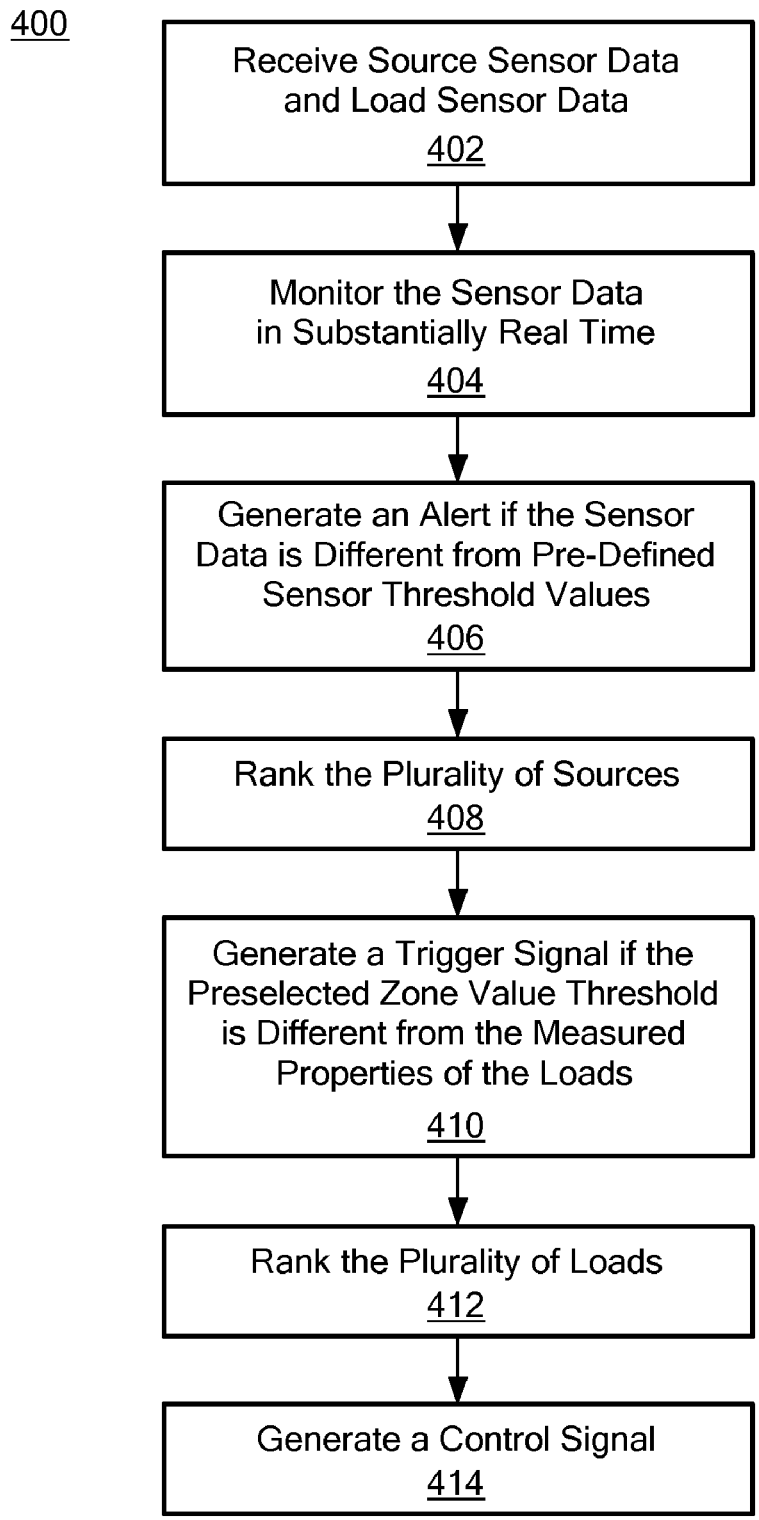
FIG. 4 illustrates a flow chart for controlling coupling and decoupling of a plurality of sources and loads.

FIG. 4 illustrates a method of controlling a plurality of sources, including on-demand sources 105, semi-on-demand sources 108, and intermittent sources 110, and a plurality of load zones 115. The controller devices 130 communicate with the plurality of sources, a plurality of source sensors, the plurality of load zones and a plurality of load zone sensors. In operation 402, the controller receives source sensor data and load sensor data. In operation 404, sensor data is monitored in substantially real-time. In operation 406, an alert is generated if the sensor data is different than the predefined sensor threshold values. In operation 408, the plurality of sources are ranked based on stored criteria and information regarding the on-demand sources 105, the semi-on-demand sources 108, the intermittent sources 110, and the data obtained from the sensors 107, 109, 112, among other devices. In operation 410, a trigger signal is generated if the preselected values received from at least one of the plurality of loads are different from the measured properties received from the corresponding load zone. In operation 412, the plurality of loads is ranked based on stored criteria and information regarding the loads 115 and the data obtained from the load sensors 117, among other devices. In operation 414, a control signal is generated to fluidly or thermally couple selected ones of the plurality of sources to selected ones of the plurality of load, or to fluidly or thermally decouple the plurality of sources and loads.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A design and control system for a hydronic apparatus comprising:
   a computing device having:
      a first receiver receiving input data including environmental data and hydronic apparatus data;
      a first processor communicating with the first receiver and processing the input data into configuration data including a hydronic apparatus layout indicating a plurality of hydronic components and fluid connections between the hydronic components;
      a transmitter transmitting the configuration data; and
   a controller having:
      a stored set of default rules;
      a second receiver receiving the configuration data;
      a second processor processing the configuration data to correlate the configuration data with the default rules and select a corresponding subset of the set of default rules.

2. The system of claim 1, wherein the subset of the set of default rules control the hydronic apparatus in substantially real-time.

3. The system of claim 2, wherein the processing of input data optimizes the hydronic apparatus layout for solar energy usage.

4. The system of claim 1, wherein processing the input data includes determining a plurality of hydronic components in the hydronic apparatus and a configuration of the hydronic apparatus.

5. The system of claim 4, wherein the input data includes at least one of a local environment information, heat loss calculation, number of heating zones, physical space available for equipment and equipment mounting requirements.

6. The system of claim 5, wherein the configuration of the hydronic apparatus indicates a first manifold path and a second manifold path are fluidly coupled to each other.

7. The system of claim 5, wherein the configuration of the hydronic apparatus indicates a primary flow loop with secondary flow loops connected to it, each secondary flow loop connected to at least one of a heat source and heat load.

8. The system of claim 5, wherein the input data determines at least one of a number of solar panels, type of solar collector, number of heat distribution manifolds and number of heat storage tanks.

9. The system of claim 1, wherein the controller selects the subset of the set of default rules upon initiation of the hydronic apparatus.

10. A method for designing and controlling a hydronic apparatus comprising:
    receiving input data including environmental data and hydronic apparatus data;
    processing the input data into configuration data, the configuration data including a hydronic apparatus layout indicating a plurality of hydronic components and fluid connections between the hydronic components;
    transmitting the configuration data from a computing device;
    receiving configuration data at a controller;
    storing a set of default rules in the controller;
    processing the configuration data at the controller; and
    selecting a subset of the set of default rules based at least on the processed configuration data.

11. The method of claim 10, further comprising controlling the hydronic apparatus in substantially real time based at least on the subset of the set of default rules.

12. The method of claim 11, wherein selecting a subset of the set of default rules occurs upon initiation of the hydronic apparatus.

13. The method of claim 10, wherein processing the input data includes determining a plurality of hydronic components in the hydronic apparatus and a configuration of the hydronic apparatus.

14. The method of claim 13, wherein the input data includes at least one of a local environment information, heat loss calculation, number of heating zones, physical space available for equipment and equipment mounting requirements.

15. The method of claim 13, further comprising transmitting the hydronic apparatus layout to a user.

16. The method of claim 15, wherein the hydronic apparatus data includes a list of components corresponding to the hydronic apparatus layout.

17. The method of claim 13, wherein the configuration of the hydronic apparatus shows a first manifold path and a second manifold path fluidly coupled to each other.

18. The method of claim 13, wherein the configuration of the hydronic apparatus shows a primary flow loop connected to secondary flow loops, each secondary flow loop connected to at least one of a heat source and heat load.

19. The method of claim 10, wherein the processing of input data optimizes the hydronic apparatus layout for solar energy usage.

20. The method of claim 10, further comprising the controller receiving an updated set of default rules.

* * * * *